United States Patent [19]

Fujiwara et al.

[11] 4,234,902

[45] Nov. 18, 1980

[54] ENCLOSED LIGHTNING ARRESTER

[75] Inventors: Yukio Fujiwara; Shigeru Yamaji; Yoshikazu Shibuya; Tohei Nitta, all of Amagasaki, Japan

[73] Assignee: Mitsubishi Denki Kabushiki Kaisha, Tokyo, Japan

[21] Appl. No.: 946,829

[22] Filed: Sep. 28, 1978

[30] Foreign Application Priority Data

Oct. 7, 1977 [JP] Japan .............................. 52/121121

Oct. 7, 1977 [JP] Japan .............................. 52/121122

[51] Int. Cl.[3] .............................................. H02H 3/22

[52] U.S. Cl. ..................................... 361/120; 315/36; 361/126

[58] Field of Search ............... 361/120, 126, 127, 128, 361/129, 130, 131, 117; 315/35, 36; 313/231.1

[56] References Cited

U.S. PATENT DOCUMENTS 3,649,875 3/1972 Nagai et al. .......................... 361/130

3,727,108 4/1973 Westrom .............................. 361/127

3,753,045 8/1973 Osmundsen et al. ................ 361/120

3,767,973 10/1973 Osmundsen et al. ................ 361/120

3,798,484 3/1974 Rich ................................ 361/120 X 3,805,114 4/1974 Matsuoka et al. .................. 361/128

3,842,318 10/1974 Nitta .................................... 361/120

4,100,588 7/1978 Kresge ................................ 361/127

*Primary Examiner*—Patrick R. Salce

*Attorney, Agent, or Firm*—Wenderoth, Lind & Ponack

[57] ABSTRACT

A lightning arrester enclosed in a grounded metal enclosure filled with $SF_6$ includes six nonlinear resistors of sintered ZnO serially interconnected in superposed relationship between a high voltage conductor and the enclosure through a cylindrical high voltage conductor. The resistors are divided into three equal units and two shield discs are interposed between the adjacent units and connected to respective hollow cylindrical conductors coaxially disposed in radially spaced relationship around the cylindrical high voltage conductor.

9 Claims, 8 Drawing Figures

ENCLOSED LIGHTNING ARRESTER

BACKGROUND OF THE INVENTION

This invention relates to a sealed gap-less lightning arrester device enclosed in a grounded metal enclosure filled with a pressurized insulating gas and utilizing nonlinear resistors having excellent nonlinear characteristics and a high electrostatic capacity, and more particularly to means for controlling the potential distribution across such a device.

In miniature substations installed in small sites, it is required to utilize small-sized lightning arresters and it has been a common practice to insulate the arresters by utilizing sulfur hexafluoride ($SF_6$). A plurality of silicon carbide (SiC) elements utilized as nonlinear characteristic elements which are the primary elements of lightning arresters, have been connected in series with a discharge gap therein between an associated high voltage conductor and a grounded metal enclosure filled with pressurized gaseous sulfur hexafluoride, the number of the series connections being determined by the associated system voltage. As a result, for a high system voltage there is the disadvantage that it is difficult to make the resulting lightning small-sized.

Recently, nonlinear resistors of the zinc oxide (ZnO) type have been developed which resistors have the ability to interrupt the power frequency follow current which is produced upon the occurrence of high surge currents at high voltages resulting from lightning strokes etc. and which are not required to be operatively associated with discharge gaps. Those nonlinear resistors have been substituted for silicon carbide elements as above described so as to make it possible to manufacture small-sized lightning arresters more suitable for use in miniature substantions. Such lightning arresters are required only to include a plurality of zinc oxide resistors connected between an associated high voltage conductor and the grounded metal enclosure thereof. The nonlinear resistor formed of the zinc oxide material presents low magnitudes of resistance to high surge currents at high voltages resulting from lightning strokes etc. while presenting very high magnitudes of resistance to currents caused from voltages normally applied thereto so that the nonlinear resistor effectively protects an electric power device from damage due to high surge currents due to lightning strokes etc. However, that nonlinear resistor presents very high magnitudes of resistance to low currents flowing through the system operated in the normal mode so that it functions as an electrostactic capacity rather than a resistance. Accordingly, when operatively coupled to any AC machine, the serially connected nonlinear resistors have different voltage shares in accordance with positions occupied within the associated grounded metal enclosure because of the influence of stray capacities developed between the same and the grounded metal enclosure. As a result, the nonlinear resistors generate unequal amounts of heat and are unevenly deteriorated until they are successively broken. This has resulted in the lightning arresters with a decreased lifetime.

Accordingly, it is an object of the present invention to provide a new and improved enclosed lightning arrester device substantially free from the disadvantages of the prior art devices as above described in which there is provided means for compensating for stray capacities developed between the grounded metal enclosure and a plurality of serially connected nonlinear resistors disposed within the latter so as to make the potential distribution across each of units into which the serially connected nonlinear resistors are equally divided, equal to the potential distributions across the other units.

SUMMARY OF THE INVENTION

According to one aspect thereof, the present invention provides an enclosed lightning arrester device comprising, in combination, a grounded metal enclosure, a high voltage conductor connected to an electric power device to be protected and extending into the grounded metal enclosure, a cylindrical high voltage conductor disposed at an extremity of the high voltage conductor located within the grounded metal enclosure, a plurality of nonlinear resistors disposed within the grounded metal enclosure and serially interconnected across the cylindrical high voltage conductor and the grounded metal enclosure, each of the nonlinear resistors having an excellent nonlinear resistance characteristic and having a high electrostatic capacity, the plurality of nonlinear resistors being divided into a plurality of units, a shield disc interposed between each pair of adjacent units of the nonlinear resistors, and a plurality of hollow cylindrical electrical conductors disposed in radially spaced relationship around the cylindrical high voltage conductor and encircling the latter, each of the hollow electrical cylindrical conductors being electrically connected to a different one of the shield discs.

According to the other aspect thereof, the present invention provides an enclosed lightning arrester device comprising, in combination, a grounded metal enclosure, a high voltage conductor connected to an electric power device to be protected and extending into the grounded metal enclosure, a cylindrical high voltage conductor disposed at an extremity of the cylindrical high voltage conductor located within the grounded metal enclosure, a plurality of nonlinear resistors disposed within the grounded metal enclosure and serially interconnected across the cylindrical high voltage conductor and the grounded metal enclosure, each of the nonlinear resistors having an excellent nonlinear resistance characteristic and having a high electrostatic capacity, the plurality of nonlinear resistors being divided into at least three units, and a first coaxial hollow cylindrical shield member and at least one second hollow cylindrical shield member including respective bottom plates interposed between at least two pairs of units of the nonlinear resistors, the first coaxial hollow cylindrical shield member including a first hollow cylindrical portion formed integrally with the bottom plate thereof and extending coaxially with and adjacent to the cylindrical high voltage conductor and encircling at least the latter, the at least one second coaxial hollow cylindrical shield member including a second hollow cylindrical portion formed integrally with the bottom plate thereof and extending coaxially with the cylindrical high voltage conductor and adjacent to a coaxial hollow cylindrical portion located immediately above the second coaxial hollow cylindrical member and enclosing at least one part of the coaxial hollow cylindrical portion.

In order to vary the electrostatic capacities developed between the cylindrical high voltage conductor and the first coaxial hollow cylindrical shield member and between the first coaxial hollow cylindrical shield member and the grounded metal enclosure respectively, there may be provided a third coaxial hollow cylindrical shield member including a bottom plate connected to the high voltage conductor that extends centrally through the bottom plate, and a hollow cylindrical portion formed integrally with the bottom plate and extending coaxially with the cylindrical high voltage conductor and adjacent to the first hollow cylindrical portion of the first coaxial hollow cylindrical shield member and encircling at least one part of the first hollow cylindrical portion.

BRIEF DESCRIPTION OF THE DRAWINGS

The present invention will become more readily apparent from the following detailed description taken in conjunction with the accompanying drawings in which.

Throughout the Figures like reference numerals and characters designate identical or corresponding components.

DESCRIPTION OF THE PREFERRED EMBODIMENTS

Figure 1:
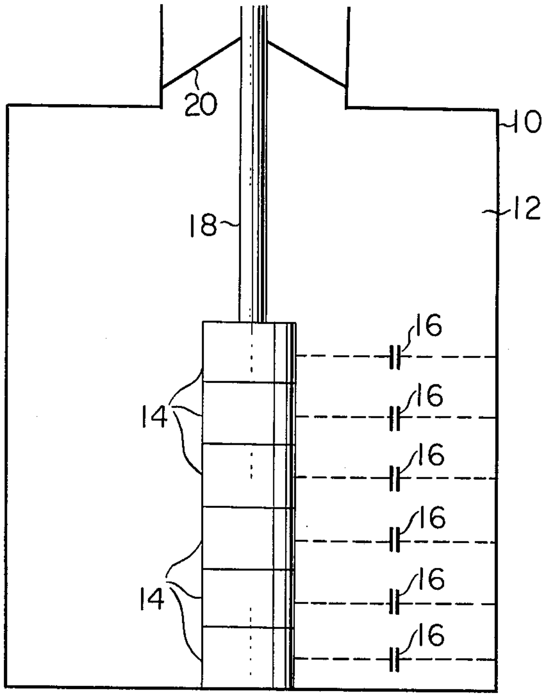
FIG. 1 PRIOR ART
FIG. 1 is a diagramatic view of a conventional enclosed lightning arrester device including nonlinear resistors.

Referring now to FIG. 1 of the drawings, there is illustrated an enclosed lightning arrester device having the conventional construction. The arrangement illustrated comprises a grounded metal enclosure 10 in the form of a hollow cylinder including a lower end closed with a flat metallic plate and an upper end portion having a reduced diameter, and an amount of a pressurized electrically insulating gas 12 having a high dielectric strength, for example, gaseous sulfur hexafluoride ($SF_6$) filling the enclosure 10. A plurality of nonlinear resistors 14, in this case six resistors, are disposed in superposed relationship on the flat bottom plate of the grounded metal enclosure 10 along the longitudinal axis thereof and are serially interconnected. Each nonlinear resistor 14 has an excellent nonlinear resistance characteristic, has a high electrostatic capacity and is in the shape of a circular pellet, for example of sintered zinc oxide (ZnO). The nonlinear resistors 14 thus disposed have stray capacities 16 developed between the same and the grounded metal enclosure 10. The uppermost resistor 14 as viewed in FIG. 1 is connected to a high voltage conductor 18 in the form of a circular rod extended through and sealed to an electrically insulating spacer 20 rigidly fitted into the upper end portion of the grounded metal endosure 10. The high voltage conductor 18 is connected to a high voltage terminal of an electric power device to be protected although the high voltage terminal and the electric power device are not illustrated only for purposes of keeping the drawings simple. In this way a stack including the superposed nonlinear resistors has been disposed between the high voltage conductor 18 and the grounded metal enclosure 10.

The operation of the arrangement shown in FIG. 1 will now be described. Each of the nonlinear resistors 14 presents a very low magnitude of resistance to high surge currents at high voltages entering the electric power device (not shown) due to lightning strokes because of their excellent nonlinear resistance characteristic. This prevents the electric power device from being subjected to a high voltage. However, when the electric power device is operated in the normal mode, each of the nonlinear resistors 14 presents a very high magnitude of resistance to a current due to a voltage normally applied across the electric power device with the result that the current is suppressed to a low magnitude sufficient to permit the device to be operated for a long time. Thus each of the nonlinear resistors having a 14 functions as a resistor low magnitude of resistance with respect to high surge currents but it presents very high magnitudes of resistance to low currents flowing through the electric power device operated in the normal mode so that the nonlinear resistors function as electrostatic capacities rather than resistors. Accordingly, this necessarily considered when the electric power device is an AC type.

Figure 2:
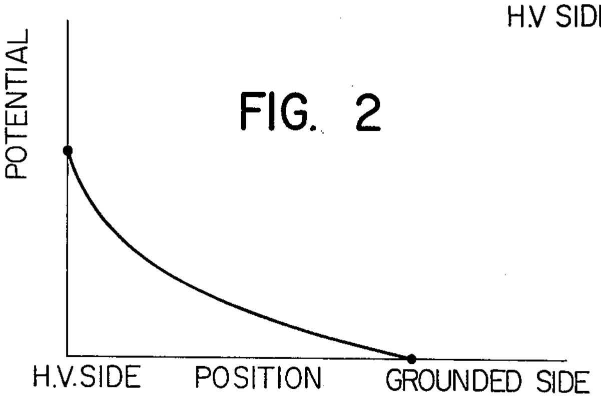
FIG. 2 is a graph illustrating the potential distribution across the nonlinear resistors disposed in the arrangement shown in FIG. 1 and having a normal AC voltage applied thereacross.

More specifically, each of the nonlinear resistors 14 has a stray capacity 16 developed between the same and the grounded metal enclosure 10 in the arrangement of FIG. 1 as above described. This stray capacity can not be disregarded with respect to the electrostatic capacity of each nonlinear resistor 14. Accordingly, when the device is normally operated with an AC voltage at a commercial frequency, the potential on the stack of nonlinear resistors 14 decreases substantially exponentially from on the maximum magnitude on the high voltage side of the stack to a null magnitude on the grounded side thereof as shown in FIG. 2 wherein the potential is plotted in ordinate against a point on the stack on the abscissa. That is, the nonlinear resistors have different voltage shares in accordance with positions occupied thereby within the stack. Accordingly, the nonlinear resistors generate unequal amounts of heat and are caused to deteriorate unevenly with the result that they are successively broken starting with the uppermost nonlinear resistor whereby the lifetime of the arrangement of FIG. 1 is greatly decreased.

Figure 3:
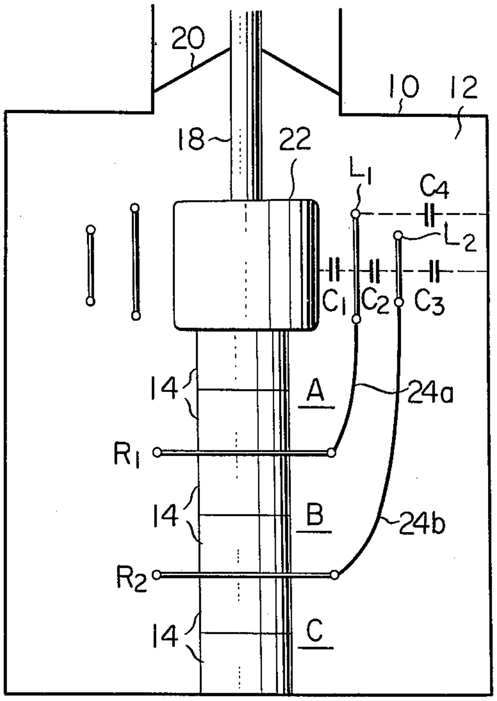
FIG. 3 is a somewhat diagramatic view of one embodiment of the enclosed lightning arrester device according to the present invention.

FIG. 3 shows one embodiment of the enclosed lightning arrester device according to the present invention. The arrangement illustrated comprises a cylindrical high voltage conductor 22 greater in diameter than the nonlinear resistors 14 which is interposed between the high voltage conductor 18 and the uppermost nonlinear resistor 14, and a plurality of electrical conductors in the form of relatively short hollow cylinders coaxially disposed adjacent to the cylindrical high voltage conductor 22 encircling the conductor 22 coaxially and in radially spaced relationship. In the example illustrated, a pair of coaxial cylindrical conductors $L_1$ and $L_2$ encircle the high voltage conductor 22 with predetermined spacings therebetween. the nonlinear resistors 3 are divided into a plurality of equal units, in this example, three units A, B and C each including two nonlinear resistors 14, and a shield disc is interposed between each pair of adjacent units of the nonlinear resistors 14. In this case a shield disc $R_1$ is interposed between the uppermost and intermediate units A and B respectively as viewed in FIG. 3 and another shield disc $R_2$ is interposed between the intermediate and lowermost units B and C respectively. The shield disc $R_1$ located near the cylindrical high voltage conductor 22 or on the higher voltage side is electrically connected to the inner cylindrical conductor $L_1$ through an electric lead 24*a* while the shield disc $R_2$ remote from the cylindrical high voltage conductor 22, or located on the lower voltage side is electrically connected to the outer cylindrical conductor $L_2$ through another electrical lead 24*b*.

In other respects the arrangement is identical to that shown in FIG. 1.

In the arrangement of FIG. 3, electrostatic capacities $C_1$, $C_2$, $C_3$ and $C_4$ are generated between the cylindrical high voltage conductor 22 and the inner cylindrical conductor $L_1$, between both cylindrical conductors $L_1$ and $L_2$ and between the outer cylindrical conductor $L_2$ and the grounded metal enclosure 10. It is assumed that each of those electrostatic capacities includes a stray capacity connected thereacross.

Upon the occurrence of high surge currents resulting from lightning strokes, the stack of the nonlinear resistors 14 exhibits a very low magnitude of resistance to prevent the voltage across the associated electric power device (not shown) from rising, just as in the arrangement shown in FIG. 1. On the other hand, when a normal AC voltage at a commercial frequency is applied across the arrangement of FIG. 3, the potential distribution across the stack of the nonlinear resistors will approximate a linear potential distribution that is ideal (see dotted line, FIG. 5) because of the presence of the electrostatic capacities $C_1$, $C_2$, $C_3$ and $C_4$. Therefore, the nonlinear resistors are prevented from deteriorating unequally.

Here it is noted that the units A, B and C and therefore the nonlinear resistors 14 have respective electrostatic capacities which do not differ due to their positions within the stack, and which are approximately equal to one another. Also those electrostatic capacities perform the function of approximating the voltage distribution across the stack to a uniform distribution by themselves although it would be slight. Thus, even though no account of such electrostatic capacities is taken when designing the enclosed lightning arresters, a uniform voltage distribution nevertheless results.

Figure 4:
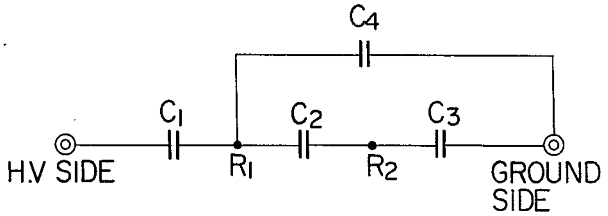
FIG. 4 is an equivalent circuit of the electrostatic capacities developed within the arrangement shown in FIG. 3.

The arrangement of FIG. 3 is equivalent to the circuit shown in FIG. 4 as far as the electrostatic capacities $C_1$, $C_2$, $C_3$ and $C_4$ are concerned. In FIG. 4, the electrostatic capacities $C_1$, $C_2$ and $C_3$ are serially interconnected in the named order between the high voltage and ground sides through the junctions $R_1$ and $R_2$. The high voltage side corresponds to the cylindrical high voltage conductor 22 and the grounded side corresponds to the grounded metal enclosure 10 while the junctions $R_1$ and $R_2$ correspond to the shield discs $R_1$ and $R_2$ respectively. The electrostatic capacity $C_4$ is connected across the junction $R_1$ and the grounded side in parallel to the serially connected capacities $C_2$ and $C_3$. In order to equalize voltages applied across the $C_1$, $C_2$ and $C_3$ to one another, the dimension and position of the hollow cylindrical conductors $L_1$ and $L_2$ can be preliminarily selected so as to meet the following requirements:

$$C_2 = C_3 \quad (1)$$

$$C_1 = C_2 + 2C_4. \quad (2)$$

Figure 5:
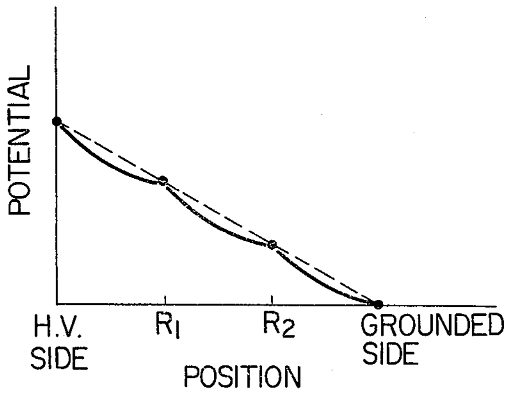
FIG. 5 is a graph illustrating the potential distributions across units into which all the nonlinear resistors shown in FIG. 3 are equally divided and which have a normal AC voltage applied thereacross.

When those requirements are met, the stack of the nonlinear resistors has the potential distribution as shown by the solid line in FIG. 5 wherein the ordinate and abscissa are the same as those designated in FIG. 2. FIG. 5 also shows a linear distribution along the dotted line that is ideal for purposes of comparison. From FIG. 5 it is seen that the junctions $R_1$ and $R_2$ or partitions of the resistor stack have respective potentials coinciding with corresponding potentials on the ideal linear distribution and that the potential distribution across each of the resistor units fairly well approximates a corresponding section of the linear potential distribution as compared with that shown in FIG. 2. It is not required to eliminate completely deviations of the potential distribution across each unit from the corresponding ideal linear distribution and those deviations may be within certain permissible limits. Also such deviations of the potential distribution across each unit depend upon the shape of the unit for example, its length, and accordingly the number of the units into which the resistor stack is equally divided may be increased in order that the resulting potential distribution will further approximate the ideal linear distribution. Also by increasing the number of units it is possible to facilitate the manufacturing of more ideal enclosed lightning arrester devices for use with high voltages.

While the present invention has been illustrated and described in conjunction with the use of the electric leads 24*a* and 24*b* for connecting the cylindrical conductors $L_1$ and $L_2$ to the shield discs $R_1$ and $R_2$ respectively it is to be understood that the cylindrical conductors and shield discs may be extended so as to be directly connected or contacted to each other and the leads can be omitted.

Also, more than two hollow cylindrical conductors may be coaxially disposed in spaced relationship around the cylindrical high voltage conductor 22. In this case, the number of the hollow cylindrical conductors is equal to the number of nonlinear resistor units minus one, and a more radially inner one of the hollow cylindrical conductor is electrically connected to the shield disc located nearer to the cylindrical high voltage conductor or on the higher voltage side. For example, the innermost hollow cylindrical conductor is electrically connected to that shield disc located nearest to the cylindrical high voltage conductor 22 and the outermost cylindrical conductor is electrically connected to the lowermost shield disc.

Figure 6:
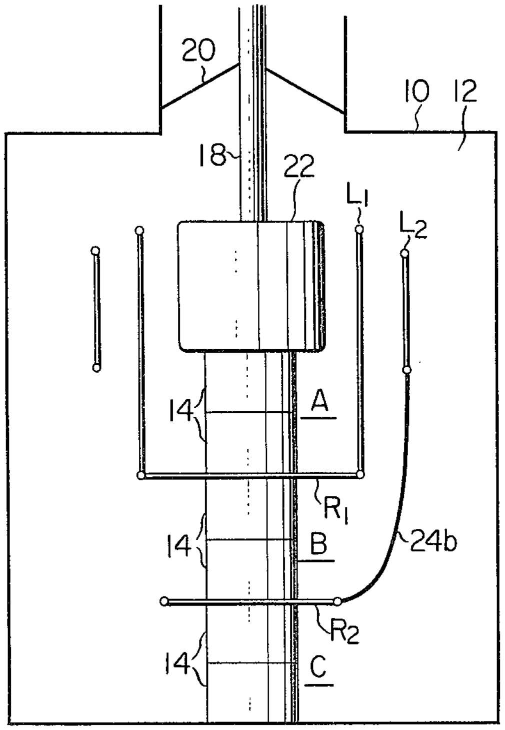
FIG. 6 is a view similar to FIG. 3 but illustrating a modification of the present invention.

The arrangement illustrated in FIG. 6 is different from that shown in FIG. 3 only in that in FIG. 6 the inner cylindrical conductor $L_1$ is extended toward the bottom of the grounded metal enclosure 10 until it is directly connected to a radially outward extension of the shield disc $R_1$.

Alternatively, the outer cylindrical conductor $L_2$ may be directly connected to the shield disc $R_2$ in the same manner as above described.

Figure 7:
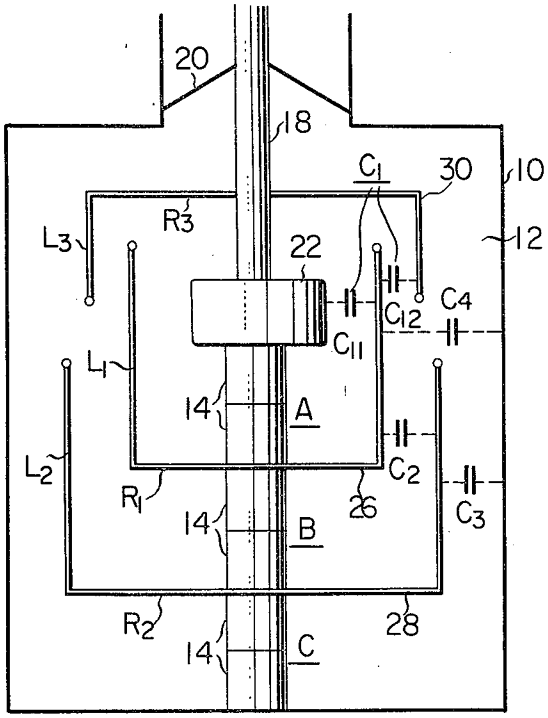
FIG. 7 is a view similar to FIG. 3 but illustrating another modification of the present invention.

FIG. 7 shows another modification of the present invention. In the arrangement illustrated, a first coaxial hollow cylindrical shield member 26 includes a bottom plate $R_1$ (which corresponds to the shield disc $R_1$ shown in FIGS. 3 and 6) interposed between the upper and intermediate resistor units A and B respectively and a first hollow cylindrical portion $L_1$ formed integrally with the bottom plate $R_1$ and extending coaxially with and adjacent to the cylindrical high voltage conductor 22. The first hollow cylindrical portion $L_1$ corresponds to the inner hollow cylindrical portion $L_1$ shown in FIGS. 3 and 6 but extends further upward to protrude somewhat beyond the upper end surface as viewed in FIG. 7 of the cylindrical high voltage conductor 22. That is, the first hollow cylindrical portion $L_1$ encircles at least the cylindrical high voltage conductor 22.

Similarly, a second coaxial hollow cylindrical shield member 28 includes a bottom plate $R_2$ interposed between the intermediate and lower resistor units B and C respectively and a second hollow cylindrical portion $L_2$ formed integrally with the bottom plate $R_2$ extends coaxially with the cylindrical high voltage conductor 22 and adjacent to the hollow cylindrical portion $L_1$ located immediately above the first shield member 26, encircling at least one part of the first hollow cylindrical portion $L_1$. In this case, the second hollow cylindrical portion $L_2$ encircles the lower part of the first hollow cylindrical portion $L_1$ facing the resistor unit A.

Further a third coaxial hollow cylindrical shield member 30 in the form of an inverted cup is disposed in the upper portion of the grounded metal enclosure 10 by having a bottom plate $R_3$ connected to the high voltage conductor 18 that extends perpendicularly through the center of the bottom plate $R_3$. The third coaxial hollow cylindrical shield member 30 includes a third hollow cylindrical portion $L_3$ formed integrally with the bottom plate $R_3$ and extending downward and coaxially with the cylindrical high voltage conductor 22. The third hollow cylindrical portion $L_3$ is disposed adjacent to the outer wall of the first hollow cylindrical portion $L_1$ encircling at least one part of the first cylindrical portion $L_1$. In the example illustrated, the third cylindrical portion encircles the upper portion of the first cylindrical portion $L_1$ and is located radially nearer to the first cylindrical portion $L_1$ than the second cylindrical portion $L_2$.

In other respects, the arrangement illustrated is similar to that shown in FIG. 3.

As shown in FIG. 7, electrostatic capacities $C_{11}$ and $C_{12}$ are developed between the cylindrical high voltage conductor 22 and the first coaxial shield 26 and between the first and third coaxial shields 26 and 30 respectively. Also as in the arrangement of FIG. 3, electrostatic capacities $C_2$, $C_3$ and $C_4$ are developed between the first and second coaxial shields 26 and 28, between the second coaxial shield 28 and the grounded metal enclosure 10 and between the first coaxial shield 26 and the grounded metal enclosure 10 respectively. The electrostatic capacity $C_1$ shown in FIG. 3 and also in FIG. 7 is equal to the sum of the electrostatic capacities $C_{11}$ and $C_{12}$. Also, it is assumed that each of those electrostatic capacities includes a stray capacity connected thereacross as in the arrangement shown in FIG. 3. Therefore the arrangement of FIG. 7 has an equivalent circuit identical to that shown in FIG. 4 excepting that the electrostatic capacity $C_1$ is replaced by $C_{11}+C_{12}$.

As in the arrangement of FIG. 3, if the dimension and position of each of the first, second and third coaxial cylindrical portions $L_1$, $L_2$ and $L_3$ are selected so as to satisfy the expression (1) and the expression (2) with $C_{11}+C_{12}$ substituted for $C_1$, then voltages applied across the electrostatic capacities $C_1=C_{11}+C_{12}$, $C_2$ and $C_3$ respectively are equal to one another. Therefore, the resulting potential distribution across the stack of the nonlinear resistors 14 will approximate the ideal linear distribution such as shown by the dotted line in FIG. 5.

As is apparent from the expression (2), the larger the capacity $C_4$ the larger the capacity $C_1$ will be. In the arrangement of FIG. 7, the capacity $C_4$ can be decreased by extending the hollow cylindrical portion $L_2$ of the second coaxial shield 28 further upward and extending the hollow cylindrical portion $L_3$ of the third coaxial shield 30 further downward. Also the electrostatic capacity $C_1$ equals the electrostatic capacity $C_{11}$ in the absence of the third coaxial shield 30 but the presence thereof causes the capacity $C_1$ to equal the capacity $C_{11}$ plus the capacity $C_{12}$ thereby to permit the capacity $C_1$ to be larger. In other words, the third coaxial shield member 30 is effective for varying in a simple way the magnitude of the electrostatic capacity $C_4$ and therefore the electrostatic capacity $C_1$ with the result that the expressions (1) and (2) can readily hold. This results in the advantage that the grounded metal enclosure 10 can be made small-sized.

The arrangement of FIG. 7 may includes a plurality of second coaxial hollow cylindrical shield members 28. In the latter case, the stack of the nonlinear resistors 14 is divided into units the number of which is equal to the number of the third coaxial shield members 28 added one. The first shield member 26 has the bottom plate $R_1$ interposed between the uppermost unit and the next succeeding unit and the innermost coaxial hollow cylindrical portion while the second shield members 28 include respective bottom plates interposed between pairs of adjacent units except for the uppermost unit and second hollow cylindrical portions formed integrally with the associated bottom plates and extending coaxially with the cylindrical high voltage conductor 22. The bottom plate located nearer to the conductor 22 or on the higher voltage side is integral with the more inner one of the second hollow cylindrical portions, and each of the second hollow cylindrical portions is disposed adjacent to that second hollow cylindrical portion located immediately above the same and encircles at least one part or the lower part of the latter.

Figure 8:
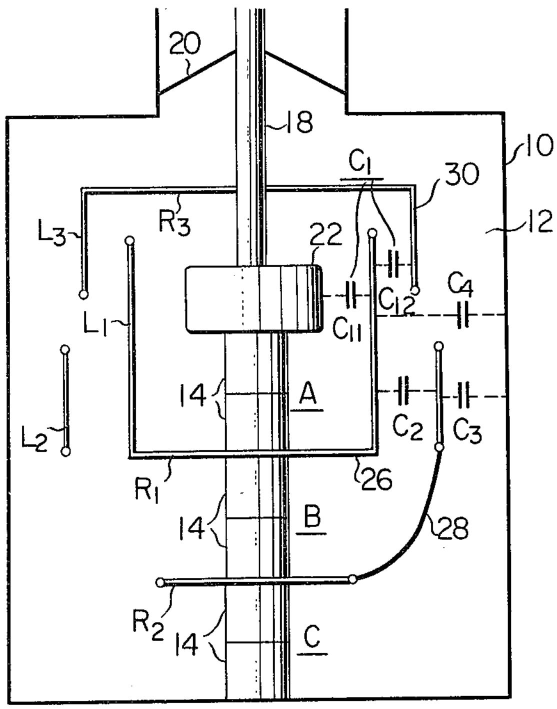
FIG. 8 is a view similar to FIG. 3 but illustrating a modification of the arrangement shown in FIG. 7.

The arrangement illustrated in FIG. 8 is different from that shown in FIG. 7 only in that in FIG. 8, the second coaxial shield 28 includes the bottom plate $R_2$ separated from the hollow cylindrical portion $L_2$ with the two being electrically interconnected by an electric head 24*b*. Alternatively, after the bottom plate $R_2$ has been separated from the hollow cylindrical portion $L_2$, the bottom plate $R_2$ may be directly connected to or contacted by the hollow cylindrical portion $L_2$.

From the foregoing it is seen that, the present invention improves the potential distribution across the stack of the nonlinear resistors when a normal AC voltage is applied thereacross by a simple construction. Thus the present invention provides an enclosed lightning arrester device having a long lifetime and a high reliability. Also as the nonlinear resistors are standardized, the present invention can derease the number of components required for varying in accordance with a voltage grade involved.

While the present invention has been illustrated and described in conjunction with a few preferred embodiments thereof it is to be understood that numerous changes and modifications may be resorted to without departing from the spirit and scope of the present invention.

What we claim is:

1. An enclosed lightning arrester device comprising, in combination, a grounded metal enclosure, a high voltage conductor adapted to be connected to an electric power device to be protected and extending into said grounded metal enclosure, a cylindrical high voltage conductor connected to the end of said high voltage conductor located within said grounded metal enclosure and coaxial with said high voltage conductor, a plurality of nonlinear resistors disposed within said grounded metal enclosure and series connected between said cylindrical high voltage conductor and said grounded metal enclosure, each of said nonlinear resistors having an excellent nonlinear resistance characteristic and having a high electrostatic capacity, said plurality of nonlinear resistors being divided into a plurality of units, a shield disc interposed between each pair of adjacent units of said nonlinear resistors, and a plurality of hollow cylindrical electrical conductors disposed in radially spaced relationship around said cylindrical high voltage conductor and coaxially encircling the latter, each of said hollow cylindrical electrical conductors being electrically connected to a different one of said shield discs.

2. An enclosed lightning arrester device as claimed in claim 1 wherein each of said nonlinear resistors is formed of sintered zinc oxide.

3. An enclosed lightning arrester device as claimed in claim 2 wherein an electric lead electrically connects each of said hollow cylindrical electrical conductors to an associated one of said shield discs.

4. An enclosed lightning arrester device as claimed in claim 2 wherein each of said hollow cylindrical electrical conductors is directly structurally connected to the associated shield disc.

5. An enclosed lightning arrester device as claimed in claim 2 wherein at least one of said hollow cylindrical electrical conductors is integral with a corresponding one of said shield discs and the other of said hollow cylindrical electrical conductors and the corresponding shield discs are connected by an electrical lead.

6. An enclosed lightning arrester device as claimed in claim 2 wherein said plurality of said hollow cylindrical electrical conductors coaxially disposed in spaced relationship around said cylindrical high voltage conductor is equal to the number of said units minus one, the shield discs successively more distant from said cylindrical high voltage conductor being electrically connected to respective cylindrical high voltage conductors which are successively more radially distant from said cylindrical high voltage conductor.

7. An enclosed lightning arrester device as claimed in claim 5 wherein a first one of said hollow cylindrical electrical conductors is disposed adjacent to said cylindrical high voltage conductor, a second one of said hollow cylindrical electrical conductor is disposed adjacent to said first hollow hollow cylindrical electrical conductor and radially outwardly thereof, and said first and second hollow cylindrical conductors each have a dimension and position selected to meet the requirements $$C_2=C_3$$

and $$C_1=C_2+2C_4$$

wherein $C_1$ is the electrostatic capacity developed between said cylindrical high voltage conductor and said first hollow conductor, $C_2$ the electrostatic capacity developed between said first and second hollow cylindrical conductors, $C_3$ the electrostatic capacity developed between said second hollow cylindrical conductor and said grounded metal enclosure, and $C_4$ the electrostatic capacity developed between the first hollow cylindrical conductor and said grounded metal enclosure.

8. An enclosed lightning arrester device comprising, in combination, a grounded metal enclosure, a high voltage conductor adapted to be connected to an electric power device to be protected and extending into said grounded metal enclosure, a cylindrical high voltage conductor connected to the end of said high voltage conductor located within said grounded metal enclosure and coaxial with said high voltage conductor, a plurality of nonlinear resistors disposed within said grounded metal enclosure and series connected between said cylindrical high voltage conductor and said grounded metal enclosure, each of said nonlinear resistors having an excellent nonlinear resistance characteristic and having a high electrostatic capacity, said plurality of nonlinear resistors being divided into at least three units, and a first hollow cylindrical shield member and at least one second hollow cylindrical shield member including respective bottom plates interposed between at least two pairs of units of said nonlinear resistors, said first hollow cylindrical shield member including a first hollow cylindrical conductor portion integral with said bottom plate thereof and coaxial with and adjacent to said cylindrical high voltage conductor and encircling said cylindrical high voltage conductor, said at least one second hollow cylindrical shield member including a second hollow cylindrical conductor portion integral with said bottom plate thereof and coaxial with said cylindrical high voltage conductor and adjacent to said first hollow cylindrical conductor portion located immediately above said second hollow cylindrical shield member and encircling at least one part of said hollow cylindrical portion.

9. An enclosed lightning arrester device as claimed in claim 8 further comprising a third hollow cylindrical shield member including a bottom plate connected to said high voltage conductor that extends centrally through said bottom plate, and a hollow cylindrical portion integral with said bottom plate and extending coaxially with said cylindrical high voltage conductor and adjacent said first hollow cylindrical conductor portion and encircling at least one part of said first hollow cylindrical portion.

* * * * *